US010539519B2

(12) United States Patent
Kinneging et al.

(10) Patent No.: US 10,539,519 B2
(45) Date of Patent: Jan. 21, 2020

(54) X-RAY DIFFRACTOMETER

(71) Applicant: xplorex GmbH, Rimsting am Chiemsee (DE)

(72) Inventors: Albertus Jacobus Kinneging, Bergen op Zoom (NL); Norman Karl Huber, Rimsting am Chiemsee (DE); Raymond Wilhelmus Herman Johannes Verbruggen, Borne (NL)

(73) Assignee: XPLOREX GMBH, Rimsting am Chiemsee (DE)

( * ) Notice: Subject to any disclaimer, the term of this patent is extended or adjusted under 35 U.S.C. 154(b) by 208 days.

(21) Appl. No.: 15/740,706

(22) PCT Filed: Jun. 9, 2016

(86) PCT No.: PCT/EP2016/063199
§ 371 (c)(1),
(2) Date: Dec. 28, 2017

(87) PCT Pub. No.: WO2017/001165
PCT Pub. Date: Jan. 5, 2017

(65) Prior Publication Data
US 2018/0113085 A1    Apr. 26, 2018

(30) Foreign Application Priority Data

Jun. 30, 2015   (NL) ..................................... 2015060
Mar. 10, 2016   (NL) ..................................... 2016409

(51) Int. Cl.
*G01N 23/207*    (2018.01)
*G01N 23/20008*   (2018.01)

(52) U.S. Cl.
CPC ..... *G01N 23/207* (2013.01); *G01N 23/20008* (2013.01); *G01N 2223/0566* (2013.01); *G01N 2223/501* (2013.01)

(58) Field of Classification Search
CPC .......... G01N 23/207; G01N 23/20008; G01N 2223/0566; G01N 2223/501
See application file for complete search history.

(56) References Cited

U.S. PATENT DOCUMENTS

| 2011/0268251 A1 | 11/2011 | He |
| 2012/0195406 A1 | 8/2012 | Asano et al. |
| 2017/0363550 A1* | 12/2017 | Kobayashi ............... G01C 9/00 |

FOREIGN PATENT DOCUMENTS

| EP | 0118965 A1 | 9/1984 |
| EP | 0497406 A1 | 8/1992 |

OTHER PUBLICATIONS

International Search Report and Written Opinion for PCT Patent App. No. PCT/EP2016/063199 (dated Jul. 26, 2016).

* cited by examiner

*Primary Examiner* — Christine S. Kim
(74) *Attorney, Agent, or Firm* — Kenealy Vaidya LLP (57) ABSTRACT

Some embodiments are directed to an x-ray diffractometer including a first arm and a second arm, the first arm being rotatably connected to the second arm at a first rotation point. A sample holder is mounted onto the first arm at an outer end of the first arm away from the first rotation point. An X-ray source is configured to emit a divergent X-ray beam so as to irradiate a surface of the sample. The second arm is rotatably connected to the X-ray source at a second rotation points. A detector is configured to detect scattered beams coming from the sample, the detector being rotatably arranged around the first rotation point. A guiding device is provided to guide the sample along a main axis of the X-ray beam thereby varying an angle between the first and second arm.

20 Claims, 11 Drawing Sheets

X-RAY DIFFRACTOMETER

CROSS REFERENCE TO RELATED APPLICATION(S)

This application is a National Phase Filing under 35 C.F.R. § 371 OF and claims priority to PCT Patent Application No. PCT/EP2016/063199, filed on Jun. 9, 2016, which claims the priority benefit under 35 U.S.C. § 119 of Dutch Patent Application No. 2016409, filed on Mar. 10, 2016, and of Dutch Patent Application No. 2015060, filed on Jun. 30, 2015, the contents of each of which are hereby incorporated in their entireties by reference.

BACKGROUND

Some Embodiments are Directed to an X-Ray Diffractometer, and more Particularly, some Embodiments are Directed to a Diffractometer for Analyzing the Structure of a Material from the Scattering Pattern Produced when an X-Ray Beam Interacts with it.

An X-ray diffractometer is a measuring instrument for analyzing the structure of a material from the scattering pattern produced when an X-ray beam interacts with it. Patent application EP0497406 describes such an X-ray diffractometer device. An X-ray source emits a divergent X-ray beam that irradiates the surface of a sample under investigation. By X-ray diffraction this beam is scattered in directions obeying Braggs law. The scattered beams are subsequently detected by a detector rotatable around a first rotation point. This rotation ensures that all, or at least a large fraction of all scattered beams can be detected sequentially. To enlarge the accessible number of scattered beams the angle at which the X-ray beam hits the sample surface can be varied. To accomplish this variation the sample is fixed by a sample holder on a first arm, which is in turn connected to a second arm at the first rotation point. The second arm is rotatably connected to the X-ray source. The center of rotation for the detector coincides with the first rotation point. When the sample is dragged along a main axis of the X-ray beam by a spindle, the connections between the first and second arm force the sample to rotate as well and thereby vary the angle between incident beam and sample surface.

SUMMARY

When scattered beams at low scattering angles need to be measured (as is often the case), the divergent X-ray beam may hit the detector directly, without first being scattered by the sample. This leads to a seriously increased background.

Some embodiments reduce or eliminate this unwanted background which may occur using the X-ray diffractometer of the state of the art.

Some embodiments provide an X-ray diffractometer including a first arm and a second arm. The first arm is rotatably connected to the second arm at a first rotation point. The diffractometer also includes a sample holder for holding a sample under investigation, the sample holder being mounted onto the first arm at an outer end of the first arm away from the first rotation point. An X-ray source is configured to emit a divergent X-ray beam so as to irradiate a surface of the sample, wherein the second arm is rotatably connected to the X-ray source at a second rotation point. A detector is configured to detect scattered beams coming from the sample, the detector being rotatably arranged around the first rotation point. The diffractometer also includes a guiding device configured to guide the sample holder along a main axis of the X-ray beam thereby varying an angle between the first and second arm. The connection between the first and second arm forces the sample holder to rotate relative to the main axis of the X-ray beam so that an angle between the main axis of the X-ray beam and the surface of the sample is varied.

The diffractometer includes a shield rotatably arranged around a third rotation point which rotation point is fixed relative to the detector, wherein the shield is configured and arranged to shield the detector from the divergent X-ray beam coming from the X-ray source but not obstructing the scattered beams coming from the sample so as to allow the scattered beams to reach the detector.

When scattered beams at low scattering angles need to be measured, the detector may be moved into the divergent X-ray beam thereby measuring unwanted background. By adding a shield that moves together with the detector in the direction of the X-ray beam, the detector can be shielded in such a way that the divergent X-ray beam will not reach the detector but still reaches the sample. Furthermore, by rotatably arranging the shield, the shield can usually or always be oriented in such a way that it will not obstruct scattered beams coming from the sample.

In an embodiment, the detector is coupled to the first rotation point by way of a detector arm, wherein the third rotation point is located on the detector arm next to the detector. By placing this third rotation point next to the detector the shield can be easily oriented not to obstruct scattered beams from the sample for high and low scattering angles, while the detector is shielded from the divergent X-ray beam.

In an embodiment, the shield includes an outer end away from the third rotation point, wherein the diffractometer further includes an orientation mechanism arranged to orientate the outer end of the shield so that while varying the angle between the main axis of the X-ray beam and the surface of the sample, the outer end points to a side edge of the sample which is nearest to the X-ray source. This construction guarantees that the shield is not obstructing the scattered X-ray beams coming from the sample.

In an embodiment, the outer end of the shield is tapered. The tapered end ensures that the shield functions in the same way irrespective of the orientation relative to the detector.

The orientation mechanism may include a guiding block and a rod slidably arranged in the guiding block wherein the guiding block is rotatably arranged around the third rotation point and wherein the rod extends from the guiding block in the direction of the end of shield nearest to the sample.

In an embodiment, the shield is arranged at an outer end of the rod and wherein the shield is spring biased by a spring arranged between the shield and the guiding block. With this mechanism it can be avoided that the shield runs into the X-ray source at extremely low values for both the angle between the divergent X-ray beam and the sample surface and the distance between the detector and the sample surface.

In an embodiment, the orientation mechanism includes a cable coupled between the detector arm near or at the third rotation point and a connection point on the first arm at the outer end of the first arm away from the first rotation point.

The flexibility of the cable enables the shield to be rotated away when the detector comes close to the sample surface. This way the shield will never or rarely obstruct the divergent X-ray beam before it intersects with the sample surface.

In an embodiment, the diffractometer includes a spring loaded roll which pulls at an outer end of the cable. The use of a spring loaded roll minimizes the space needed at the rear end of the shield when the detector is moved close to the sample. Therefore, the construction can be made very compact.

In an embodiment, the diffractometer includes a blocking device which forces the shield to rotate around the third rotation point in a situation wherein the shield abuts against the blocking device so as to avoid the shield from shielding the sample under investigation. This ensures that the shield will never or rarely obstruct the divergent X-ray beam before it intersects with the sample surface, while the detector is still effectively shielded from the divergent X-ray beam.

In an embodiment, the shield includes an extension extending in a direction perpendicular to a plane in which the first and second arm are able to rotate, the blocking device including a bar extending from the X-ray source towards the sample holder and being slightly angled relative to the main axis of the X-ray beam, wherein if the extension of the shield is forced against a side of the bar, the shield will rotate out of the X-ray beam.

In an embodiment, the cable runs along a guidance point arranged on a bottom side of the shield or of the guiding block, wherein the cable bends at the guiding point due to forces originating from the shield being forced against the blocking device. This guidance point ensures that the shield is usually or always oriented correctly.

In an embodiment, the diffractometer includes a further shield arranged close to diaphragm, the further shield extending substantially parallel to the guidance bar, wherein the further shield prevents radiation scattered from the edge of diaphragm to enter the detector. This second shield reduces background radiation that circumvents obstruction from the first shield, because it was scattered from the diaphragm.

In an embodiment, the further shield can be rotated away from its original position. This rotation prevents collision between the first and the second shield at extremely low values for both the angle between the divergent X-ray beam and the sample surface and the distance between the detector and the sample surface.

BRIEF DESCRIPTION OF THE DRAWINGS

These and other aspects of some embodiments are apparent from and will be elucidated with reference to the embodiments described hereinafter. In the drawings.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EXEMPLARY EMBODIMENTS

Figure 1:
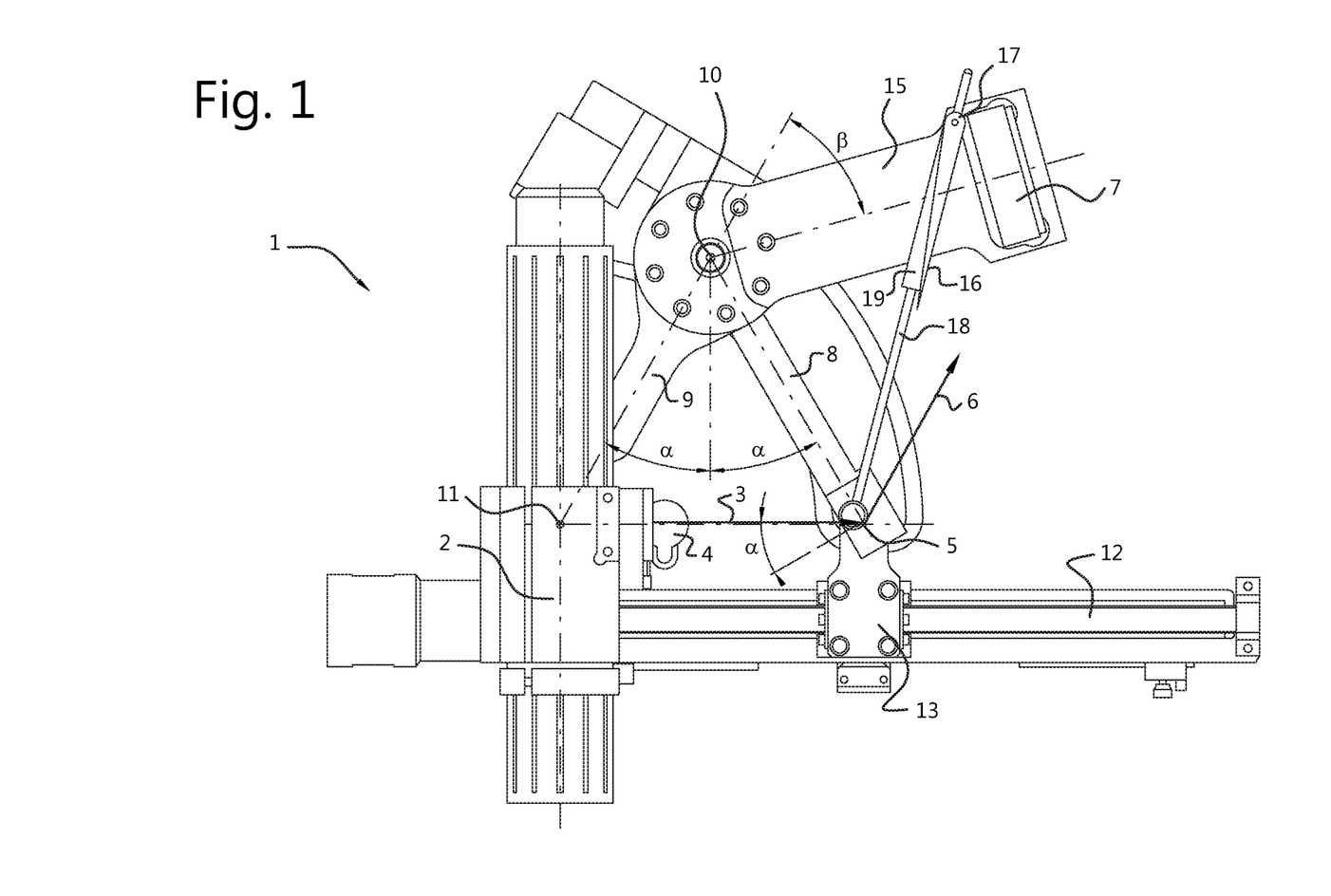
FIG. 1 shows a top view of the X-ray diffractometer 1 according to some embodiments.

FIG. 1 shows a top view of the X-ray diffractometer 1 according to some embodiments. The diffractometer includes an X-ray source 2 which emits a divergent X-ray beam (not visible in FIG. 1) that irradiates the surface of a sample 5 under investigation. In FIG. 1 a main axis 3 of the divergent X-ray beam is indicated by a line 3. In the following the divergent X-ray beam is also referred to as the direct beam 50, see also FIG. 5. A diaphragm 4 is positioned close to the X-ray source 2 to limit the beam divergence to ensure that only the sample surface is irradiated. However, because the direct beam 50 is also scattered by air the edges of the direct beam are rather diffuse. This results in a significant part of the direct beam hitting the detector without interacting with the sample.

Due to X-ray diffraction the direct beam 50 is scattered in directions obeying Braggs law. In FIG. 1, an arrow 6 indicated a main axis of one of the scattered beams. The scattered beams are subsequently detected by a rotating detector 7. This rotation ensures that all or most, or at least a large fraction of the scattered beams can be detected sequentially. In an embodiment the detector 7 includes an array of sensors. By using an array of sensors rather than a single detector the sensitivity and the speed of the measurements is improved.

To enlarge the accessible number of scattered beams an angle α (hereafter: angle of incidence α) at which the direct beam 50 hits the sample surface can be varied. To accomplish this variation the sample 5 is fixed on a first arm 8 (also referred to as sample arm), which is in turn connected to a second arm 9 (also referred to as tube arm) at rotation point 10. The tube arm 9 is rotatably connected to the X-ray source 2 at a rotation point 11. So both connections of tube arm 9 are rotation points. The center of rotation for a detection surface of the detector 7 coincides with the rotation point 10.

As shown in the top view of FIG. 1, the X-ray diffractometer 1 also includes a spindle 12 and a coupling body 13 slidably arranged onto the spindle 12. The coupling body 13 is arranged to rotatably couple the sample arm 8 to the spindle 12. The coupling body 13 is moved along the spindle 12 by a motor (not shown). In this way the sample 5 being positioned in a sample holder at the outer end of the sample arm 8, can be dragged along the main axis 3 of the direct beam 50 by the spindle 12, the coupling body 13 and the motor. The spindle 12, the coupling body 13 and the motor are further referred to as the guiding device for guiding the sample 5.

When the sample 5 is dragged along a straight line parallel to the spindle 12, the connections between the sample arm 8, the tube arm 9 and the coupling body 13 force the sample 5 to rotate as well and thereby vary the angle α between the incident beam (i.e. main axis 3) and sample surface. As can be seen from FIG. 1, an angle between the sample arm 8 and the tube arm 9 is two times α.

The diffractometer 1 further includes a detector arm 15 which is rotatably coupled to the tube arm 9 at the rotation point 10. An angle between the main axis of the tube arm 9 and the detector arm 15 is referred to as angle β.

It is noted that the X-ray diffractometer 1 in FIG. 1 is in a position wherein the diffracted beams 6 do not reach the detector 7. Once the angle β is increased, as will be shown in FIG. 2, the diffracted beams 6 will reach the detector 7. But when scattered beams at low scattering angles need to be measured, the direct beam 50 might hit the detector 7 directly, without first being scattered by the sample 5 (as will explained in detail with reference to FIGS. 5, 6a and 6b). This leads to a seriously increased background.

To eliminate this unwanted background, a shield 16 is moved between the X-ray source 2 and the detector 7. This shield 16 is positioned to block radiation coming directly from the source 2, while radiation travelling via the sample 5 (i.e. the diffracted beams 6) can enter the detector 7 freely. The shield 16 is rotatable around a rotation point 17 near the detector 7. In the embodiment of FIG. 1, the rotation point 17 is arranged on the detector arm 15. The shield 16 may have a tapered outer end as can be seen from the top view shown in FIG. 1. It is noted that all or most of the rotation points mentioned above are actually rotation axis which run parallel relative to each other and perpendicular to the paper plane of FIG. 1.

When the detector 7 is rotated away from the sample 5, the shield 16 will be rotated to prevent it to block radiation scattered from the sample surface. This is realized by mounting the shield 16 on a ruler or guidance 18. The ruler or guidance 18 may be a rod 18 which is arranged between the detector arm 15 and the outer end of the sample arm 8 where the sample 5 is held. In an embodiment, the guidance 18 ensures that the shield 16 is directed towards the edge of the sample nearest to the X-ray source. Possibly or preferably the shield 16 is sharp at its outer end away from rotation point 17. The shield 16 rotates with the angle of incidence and functions in the same way for all or most of the angles of incidence.

Figure 2:
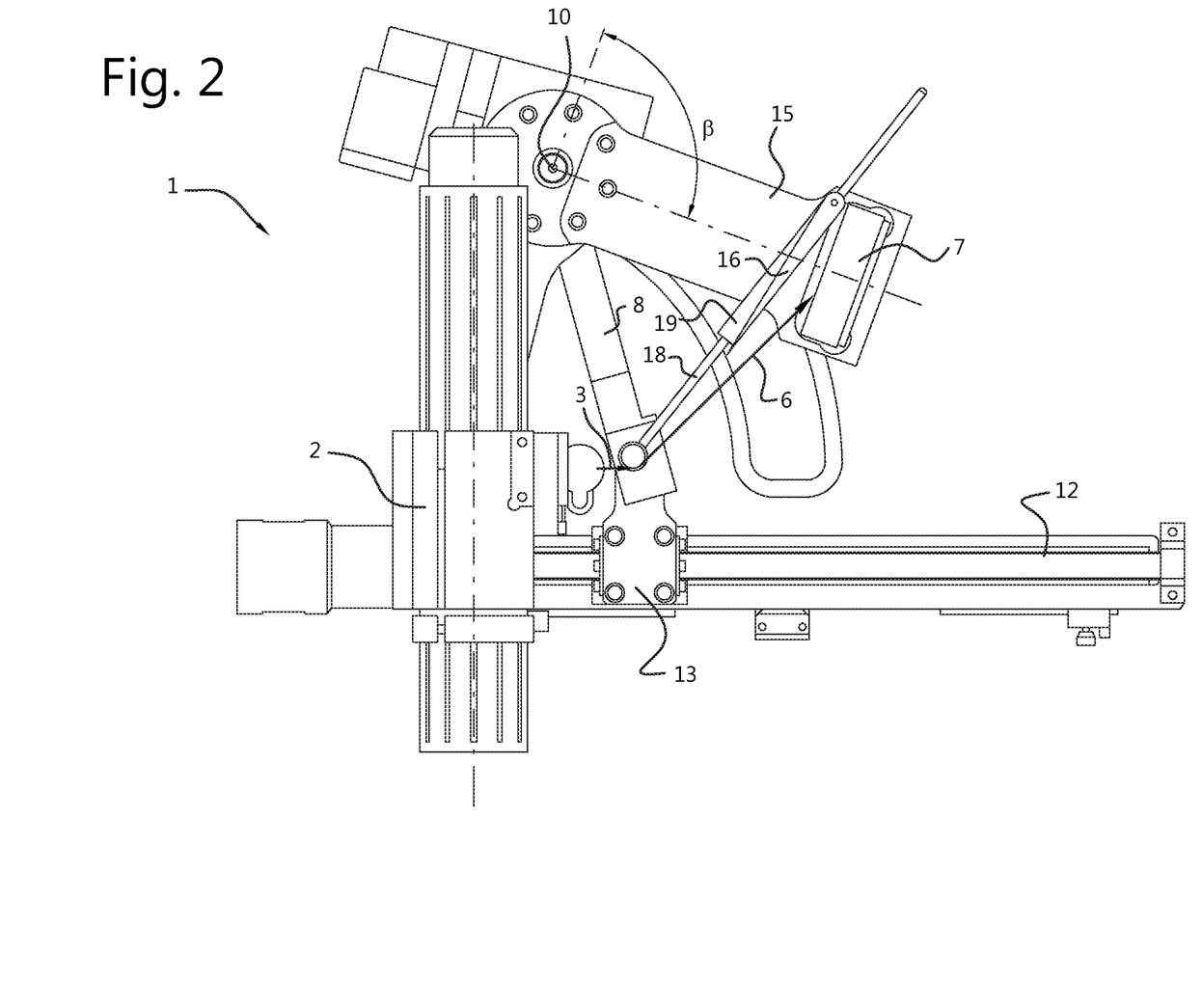
FIG. 2 shows a top view of the X-ray diffractometer according to the embodiment of FIG. 1 but in a different state.

FIG. 2 shows a top view of the X-ray diffractometer 1 according to the embodiment of FIG. 1 but in a different state. As compared to the situation of FIG. 1, the angle of incidence α is decreased. The angle β is set so as to be able to detect the diffracted beams. In FIG. 2, the angle β is set to about 90°. The guiding rod 18 is fixed close to the sample and slidably mounted at the detector end in a guiding block 19. As the detector 7 moves closer to the sample, the rod 18 slides through the guiding block 19 and thus extends further at the far end of the detector 7.

Figure 3:
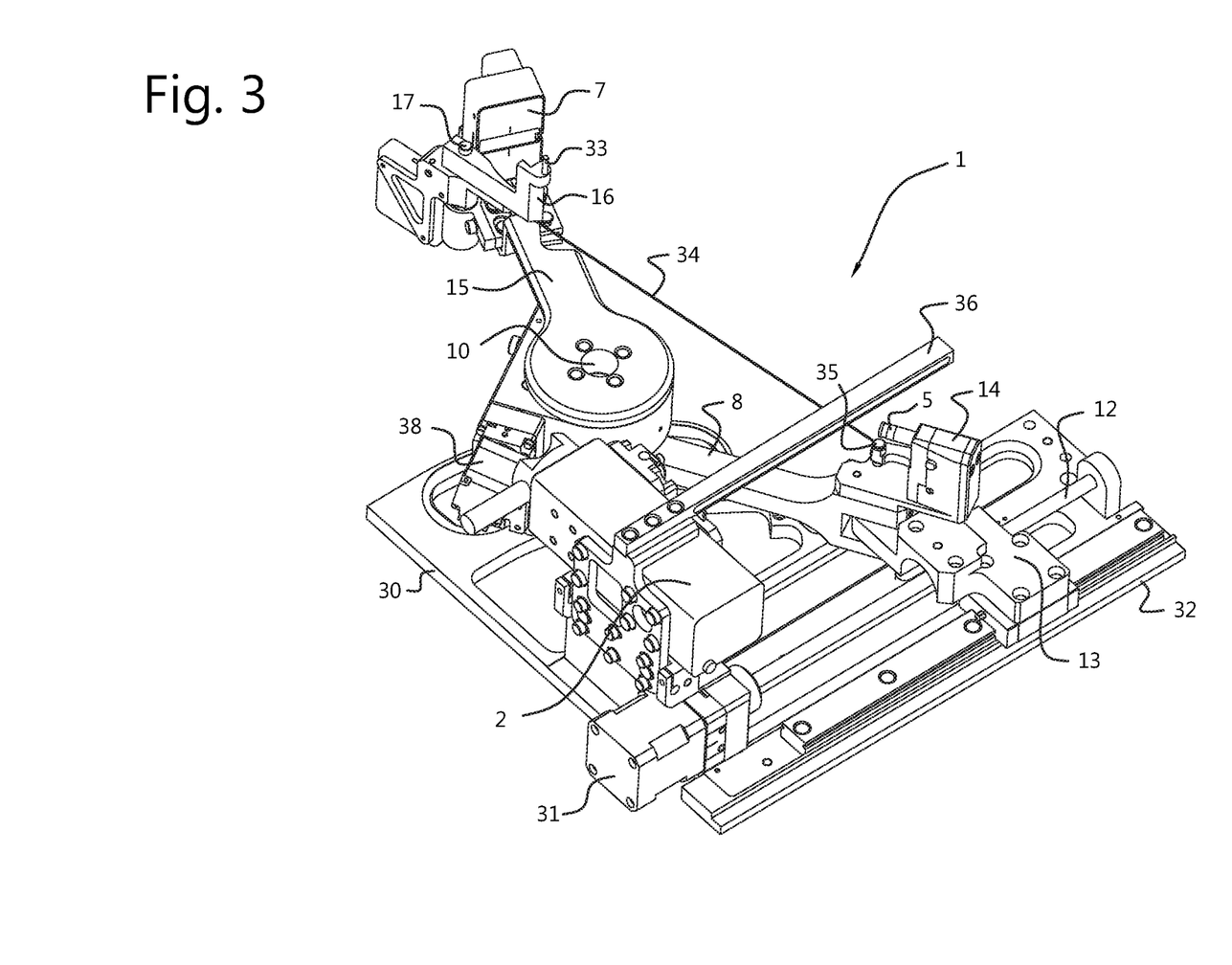
FIG. 3 is a perspective view of an embodiment of the X-ray diffractometer.

FIG. 3 is a perspective view of an embodiment of the X-ray diffractometer 1. The diffractometer 1 includes a bottom plate 30 on which an X-ray source 2 is mounted. A spindle 12 is also arranged on the bottom plate 30. A coupling body 13 is slidably arranged on the spindle 12. A motor 31 is arranged on the bottom plate 30 and configured to displace the coupling body 13 along the spindle 12. A sample holder 14 is arranged on the coupling body 13. The sample holder 14 holds the sample 5. Next to the bottom plate 30 a slider 32 is arranged which interacts with the coupling body so as to eliminate mechanical play thus ensuring an exact linear movement of the sample holder 14.

FIG. 3 further shows a detector 7 arranged on the detector arm 15, and a shield 16 rotatably arranged next to the detector 7. The shield 16 is rotatable around a rotation point 17. The shield 16 includes a main blocking part extending in a direction parallel to the bottom plate 30 and an upright extension extending in a direction perpendicular to the bottom plate. On top of the upright extension, a pin 33 is arranged. A cable 34 is arranged between the rotation point 17 and a connection point 35 near the sample holder 14. In this embodiment the cable 34 functions as guidance 18. FIG. 3 further shows a bar 36 which is connected to the X-ray source 2 and extends along the X-ray beam (not shown) coming from the X-ray source 2. Finally, FIG. 3 also shows a motor 38 arranged and configured to determine the angle β of the detector arm 15.

Figure 4:
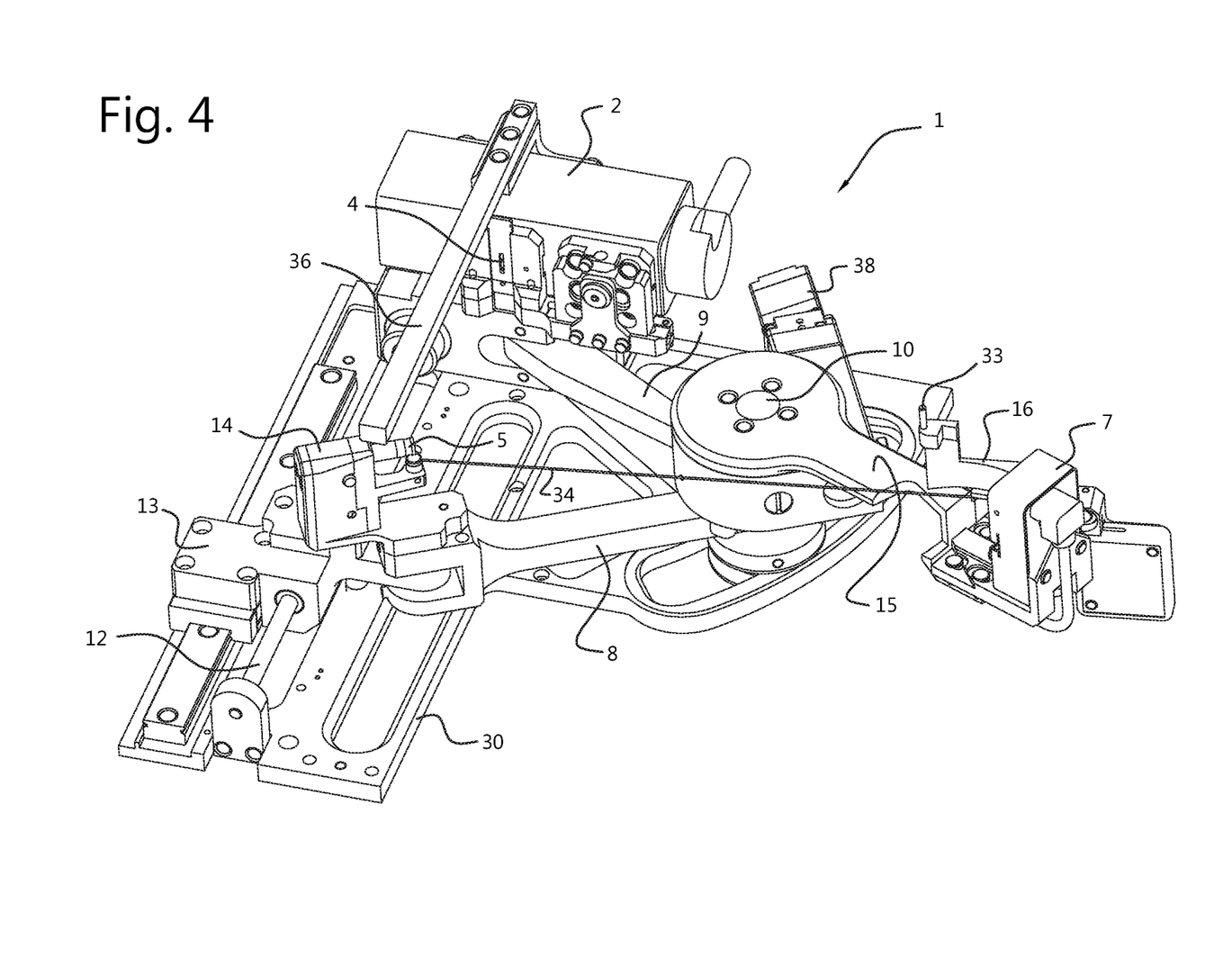
FIG. 4 is a perspective view of the embodiment of the X-ray diffractometer of FIG. 3 seen from a different perspective.

FIG. 4 is a perspective view of the embodiment of the X-ray diffractometer of FIG. 3 seen from a different perspective. In FIG. 4 the tube arm 9 is visible. Furthermore, the diaphragm 4 is visible through which the divergent X-ray beam leaves the X-ray source 2. It is noted that the X-ray source 2 can be a point source or a line source.

Figure 5:
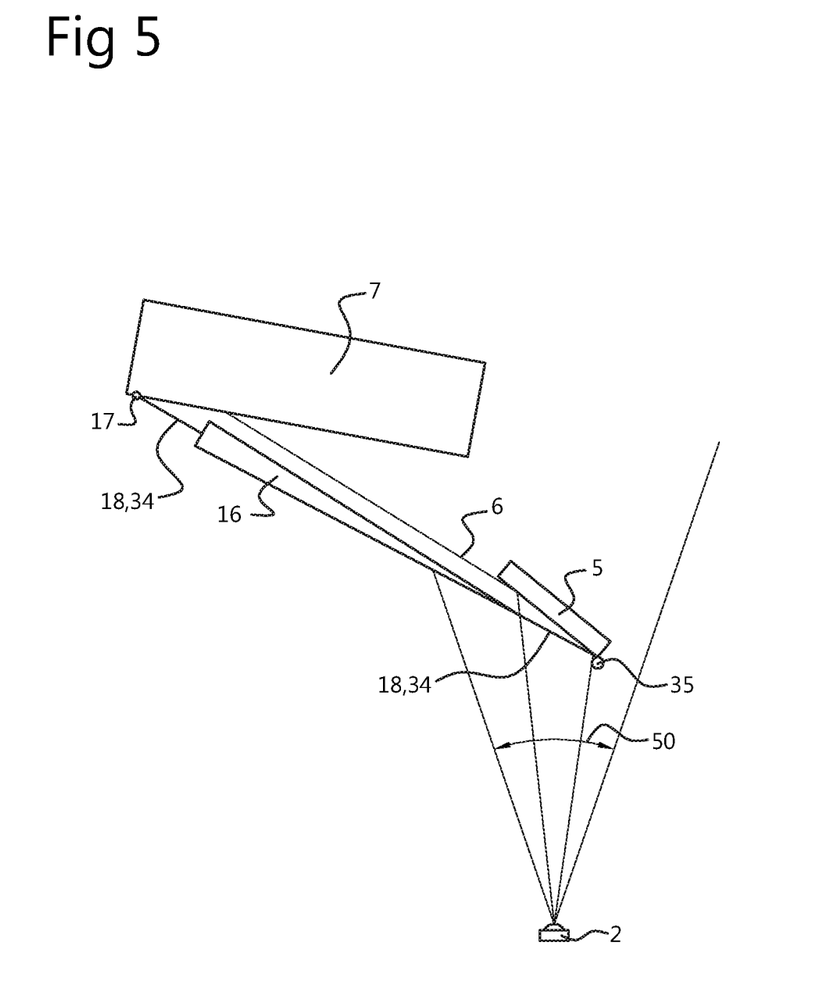
FIG. 5 shows the divergent X-ray beam coming from the source and hitting the sample.

FIG. 5 shows a top view of the detector 7, the sample 5 and the shield 16 according to an embodiment. FIG. 5 also shows the divergent X-ray beam 50 (i.e. the direct beam) coming from the source 2 and hitting the sample 5. The shield 16 is configured to prevent the direct beam 50 from directly hitting the detector 7. Due to the dimensions and the positioning of the shield 16, the direct beam 50 will not hit the detector 7 and only diffracted beams 6 will reach the detector 7. This means that due to the shield 16, so-called background is prevented. Please note that the dimensions of the sample 5 relative to the detector 7 are exaggerated in FIG. 5.

In the embodiment shown in FIG. 5, the shield 16 includes a tapered outer end away from the rotation point 17. The diffractometer includes an orientation mechanism arranged to orientate the tapered outer end of the shield 16 so that the tapered outer end points to a side edge of the sample 5 which is nearest to the X-ray source 2. Due to the combination of the tapered outer end (i.e. edge) of the shield 16 and the pointing to the side edge, an optimal part of the X-ray beam can be used to radiate the sample also in these situations with large α and β.

Figures 6A, 6B:
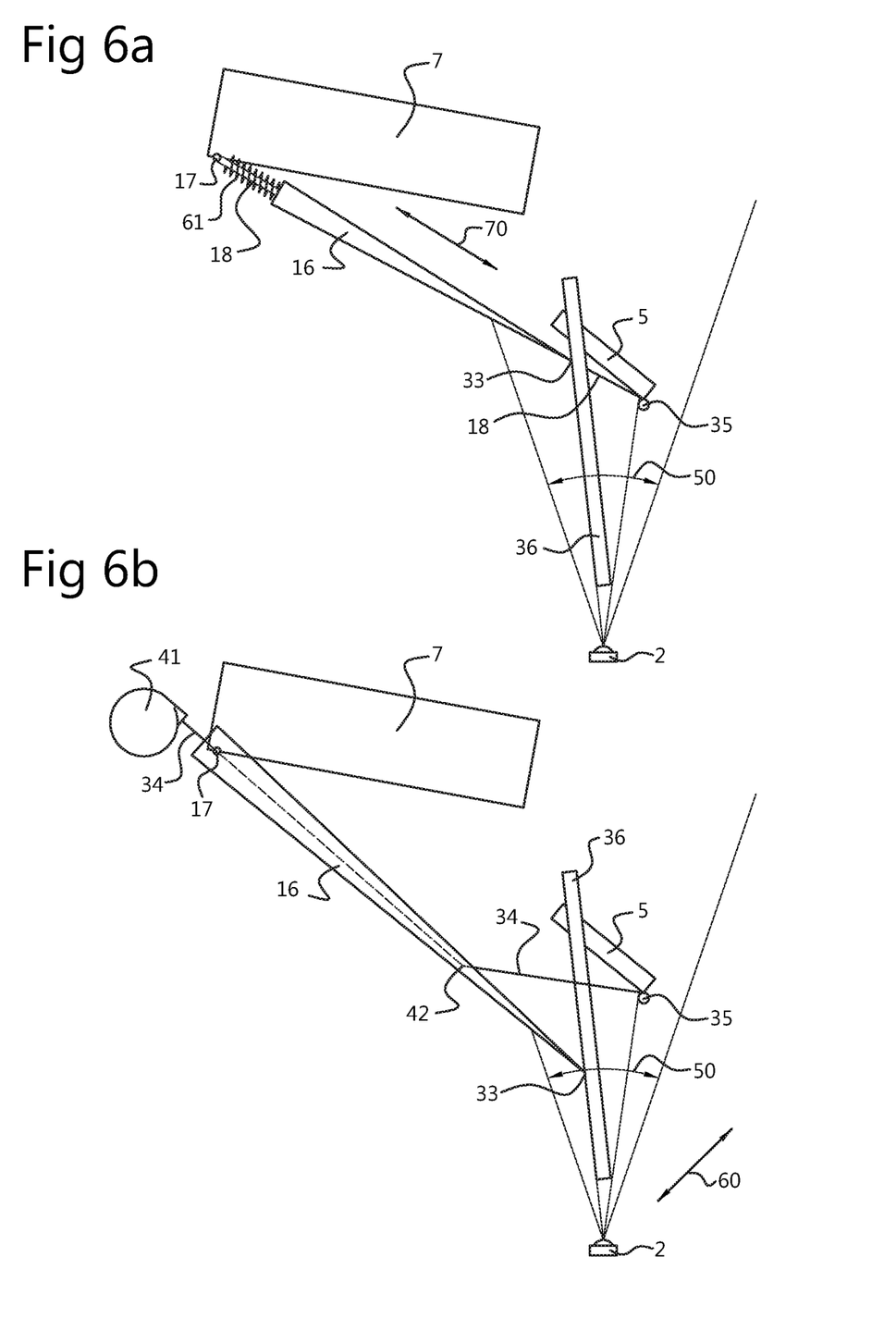
FIG. 6a schematically shows a top view of the shield and the bar.
FIG. 6b schematically shows a top view of the shield and the cable.

As the angle of incidence α increases the shield 16 may block the direct X-ray travelling to the sample surface. To prevent this, the shield 16 according to an embodiment is turned away with increasing angle of incidence. This is achieved by arranging a pin 33 (see also FIG. 8) on the shield 16 which pin 33 will eventually meet a side of the bar 36. Such a situation is depicted in FIG. 6b. FIG. 6b schematically shows a top view of the shield 16 and the bar 36. An arrow 60 indicates in which direction the shield 16 is turned in order to avoid intercepting the direct beam 50 before it hits the sample 5. The shield 16 is guided by the flexible cable 34. When pin 33 abuts with bar 36 the cable 34 will be bent at the guidance point 42. The spring loaded roll 41 prevents the cable from hanging loose at all or most times so that the shield 16 will automatically turn back in case the pin 33 leaves the bar 36 again. In this way the shield 16 will return to its position determined by the cable 34 which tends to orientate the sharp side of the shield towards the side edge 51 of the sample 5, see FIG. 5, through connection point 35. Because pin 33 is connected to the shield 16, the shield 16 is pushed out of the direct beam 50. This ensures the whole sample is illuminated at all or most times.

In the embodiment with the stiff guidance 18 shown in FIGS. 1 and 2, the flexible cable 34 is replaced by the stiff guidance 18. In this embodiment, the shield 16 is pushed along the stiff guidance 18 in its correct position by a spring 61 as shown in FIG. 6a. As the sample 5 is moved away from the X-ray source 2, the bar 36 prevents the shield 16 to intercept the beam traveling to the sample surface by blocking pin 33. Because the pin 33 is connected to the shield 16, the shield 16 is pushed back along the stiff guidance 18 by the bar 36, thus ensuring the sample 5 is completely illuminated at all or most times. This translation is indicated by double sided arrow 70 in FIG. 6a. At the same time spring 61 is loaded.

When the sample 5 is moved towards the X-ray source 2, or when the detector 7 is rotated away from the sample 5, the spring 61 will relax and push back the shield 16 in its original position. This ensures the shield 16 is functioning optimally at all or most times. The embodiment with the flexible cable is easier to realize as compared to the other embodiment.

Figure 7:
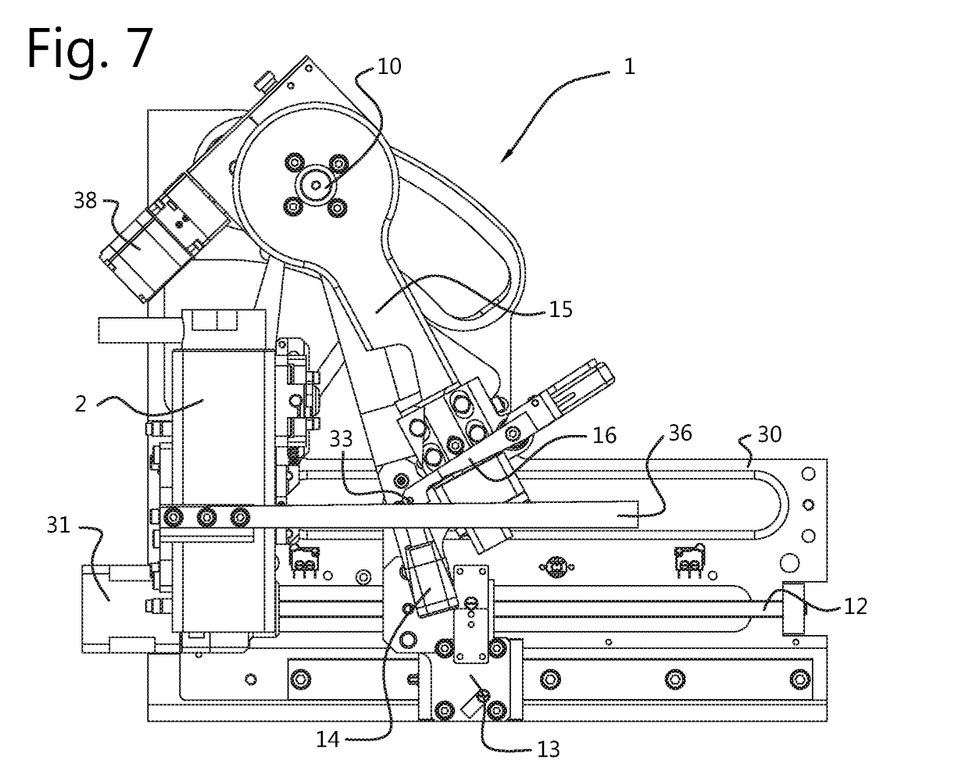
FIG. 7 shows a top view of the embodiment of FIGS. 3 and 4 in which the pin abuts against the bar.

FIG. 7 shows a top view of the embodiment of FIGS. 3 and 4 in which the pin 33 abuts against the bar 36 in order to turn the shield 16 out of the direct beam 50 so as to avoid the shield 16 from blocking the sample under investigation.

Figure 8:
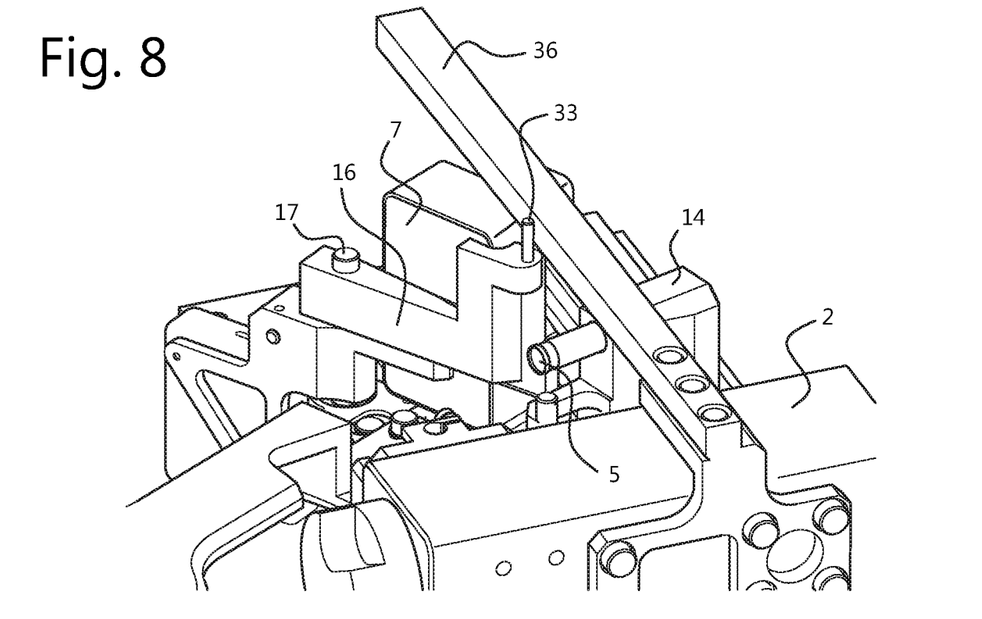
FIG. 8 shows a perspective view of the situation of FIG. 7.

FIG. 8 shows a perspective view of the situation of FIG. 7. As can be seen from FIG. 8, the bar 36 forces the shield 16 to rotate around rotation point 17 in the direction of arrow 60 thus preventing it from intercepting the direct beam before it hits the sample.

To reduce the contribution of the air-scattered beam 50 sufficiently, the shield 16 must or should be have sufficient length. As a consequence, especially in the embodiment shown in FIG. 6b, the tip of the shield 16 may collide with the X-ray tube 2 when both the spindle 12 and the detector 7 are driven to very low positions wherein the sample 5 is as close as possible to the X-ray tube 2 and the detector 7 is as close as possible to the sample 5. To prevent such a collision, the movement of the shield 16 shown in FIG. 6a and the rotation of the shield 16 shown in FIG. 6b could be combined in one mechanism.

Figure 9:
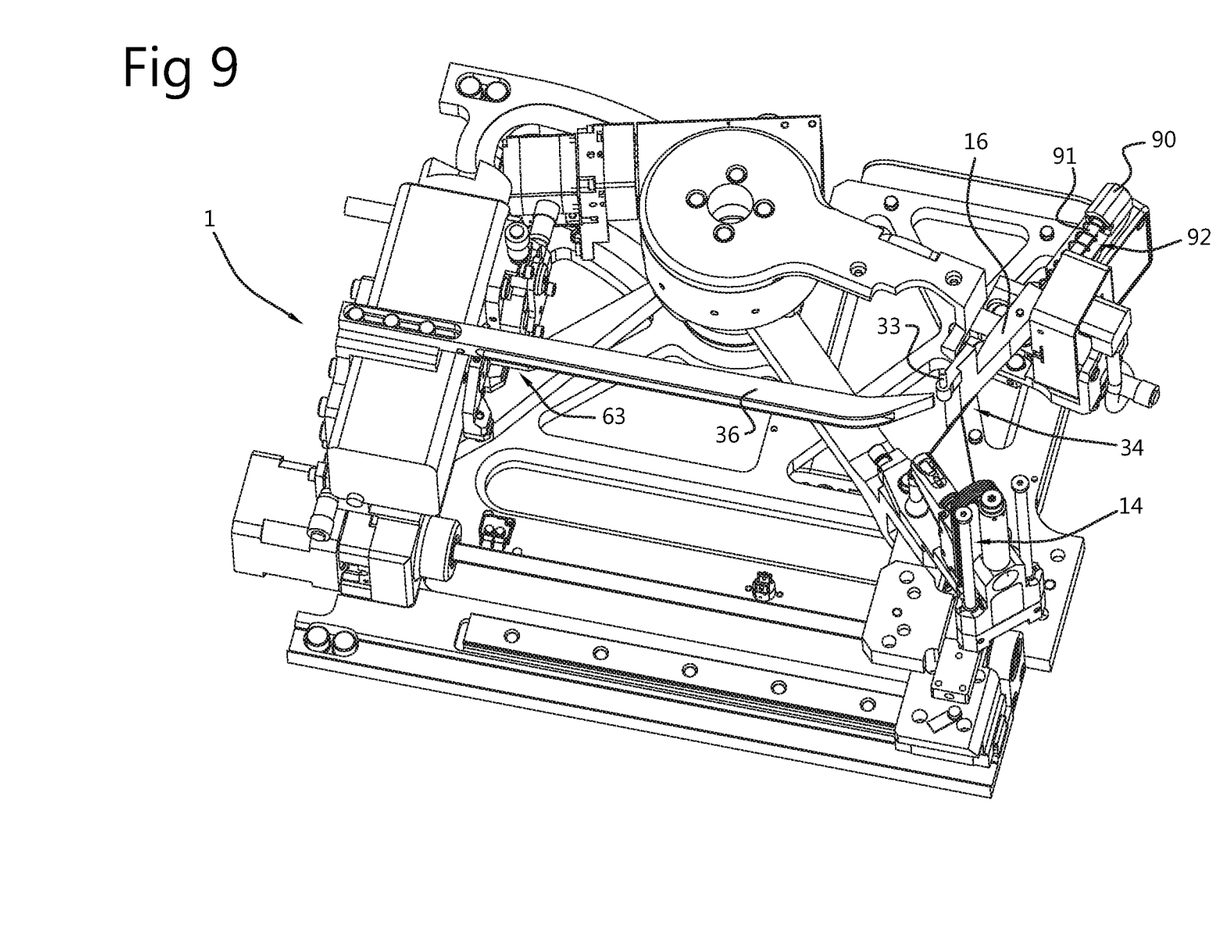
FIG. 9 shows a perspective of an embodiment with a second screen close to the X-ray source to block X-rays scattered from the divergence slit.

FIG. 9 shows an embodiment of the diffractometer 1 with such a combined mechanism. The shield 16 is mounted at an outer end of a guiding rod 91, which is slidable in a guiding block 90. The guiding block 90 is rotatable around rotation point 17. Details of a possible embodiment of the guiding block 90 are described with reference to FIGS. 12-14.

The shield 16 is spring loaded by a spring 92 arranged between the guiding block 90 and the shield 16. The assembly of the guiding block 90, the guiding rod 91 and the shield 16 is fixed to the spring loaded guidance 34 as was implemented in FIG. 6b so that it rotates in the same way as the screen 16.

In the example of FIG. 9, the guidance bar 36 now has a tapered end and is slightly bent at the end furthest away from the X-ray source 2. The sole purpose of this modification is to enable sample loading without opening the diffractometer. To change/load the sample 5, the sample holder 14 can be moved up by a user or automatically. Subsequently the sample 5 is exchanged/loaded and the sample holder 14 is moved back to the measurement position. This up-down movement is only possible if the guidance bar 36 is not in the way. Therefore, it is bent at the far end. Please note that at this far end the bar 36 cannot be used for the purpose of guiding the shield 16 properly. The impact of this to the accessible measurement range is however very limited.

Figure 10:
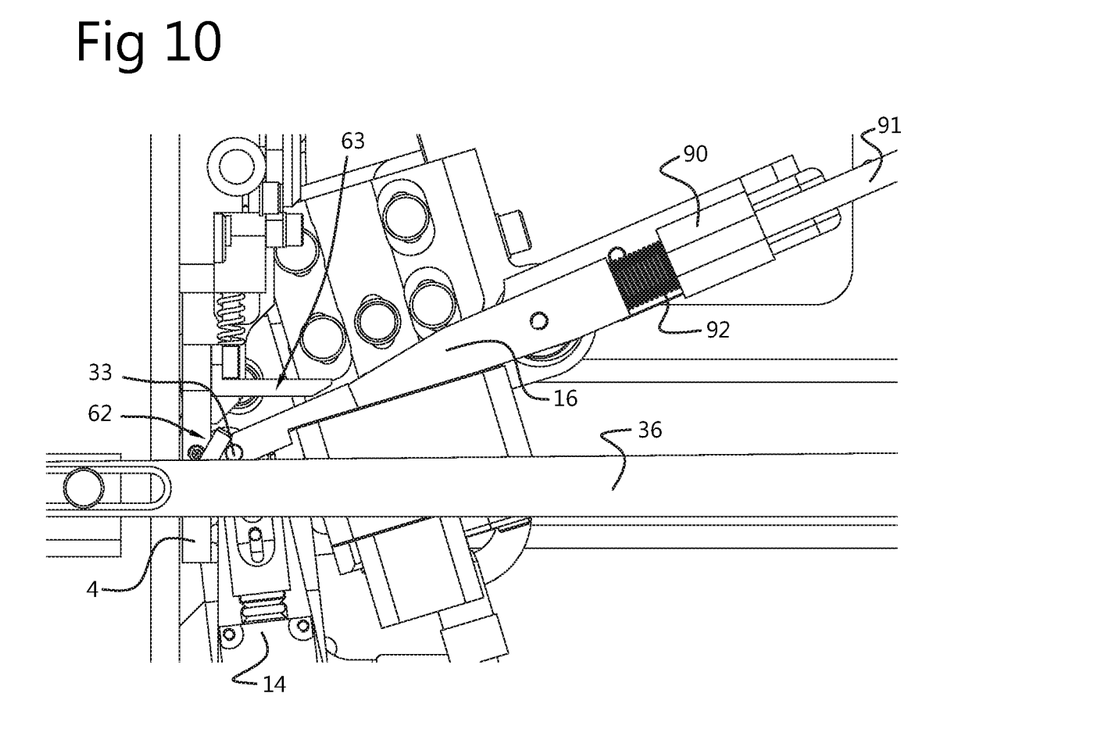
FIG. 10 shows a top view of an embodiment at very low settings for both detector angle and sample position.

FIG. 10 shows a detail of the embodiment of FIG. 9. As can be seen from FIG. 10, the diffractometer 1 also includes an extension 62 arranged close to the diaphragm 4 and extending from the guidance bar 36 at a side of the guidance bar 36 where the pin touches the guidance bar 36. When the pin 33 touches the guidance bar 36, the shield 16 is rotated away as was described with reference to FIG. 6b. However, when the sample 5 is very close to the X-ray tube 2 and the detector 7 is turned to very low angles, the shield 16 may collide with the X-ray tube 2. To prevent this collision, the pin 33 is blocked by the extension 62. Consequently, the shield 16 is pushed back and the spring 92 is loaded. As soon as the detector 7 is moved away from this extreme position, the spring 92 is relaxed and the shield 16 is pushed back by the spring 92 into its original position.

The embodiment of FIGS. 9 and 10 includes a second shield 63 arranged close to diaphragm 4. This second shield 63 extends substantially parallel to the guidance bar 36. The second shield 63 prevents radiation scattered from the edge of diaphragm 4 to enter the detector 7. As the second shield 63 extends into this scattered beam 50 (see also FIG. 6b), it may collide with the first shield 16 at very low sample position and detector angle. To avoid this collision, the second shield 63 may either be positioned further away from the diaphragm 4 (and longer), or it may be rotatably mounted so that it can pushed away by a mechanism connected to the detector arm 15 as it is close to the position where the shield 16 would run into the second shield 63. The rotatable second shield 63 could be held substantially parallel to bar 36 by a spring 66, so that it will return back to a stationary position when not pushed against.

Figure 11:
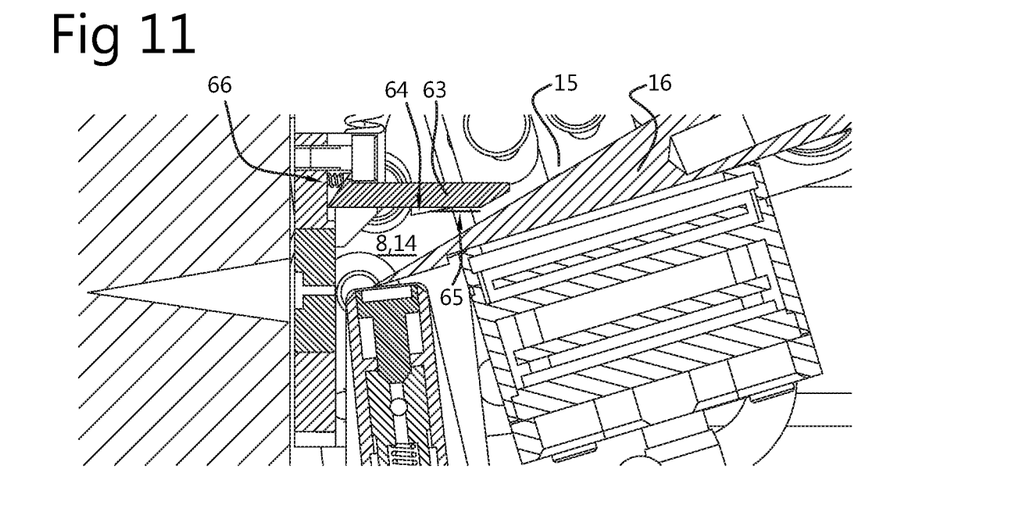
FIG. 11 shows a detail of the same embodiment in the same state as in FIG. 10 with a provision to rotate the second screen to avoid collisions with the first screen.

One possible solution is sketched in FIG. 11. Fixed on the shield 63 is a triangular block 64 at a height so that the sample arm 8 and the sample holder 14 can run free underneath. On the detector arm 15 a pin 65 is fixed, which pushes against the block 64 before the shield 16 can collide with the second shield 63. Because the block 64 is triangular shaped, the second shield 63 will be rotated away, thus avoiding a conflicting situation. A spring 66 is loaded, which pushes the second shield 63 back to its original position as soon as the detector arm 15 is moved away. The spring 66 in FIG. 11 is just an example, it may be any type of spring such as a helical spring or leaf spring. Please note that the spring 66 doesn't need to be very strong.

Instead of using the block 64 and the pin 65, the rotation of the second shield could be activated by the first shield 16 itself.

It is noted that in the situation of FIGS. 10 and 11 the X-rays scattered by the diaphragm 4 will not hit the detector 7, so the turning away of the second shield 63 will not affect the measurement.

Figure 12:
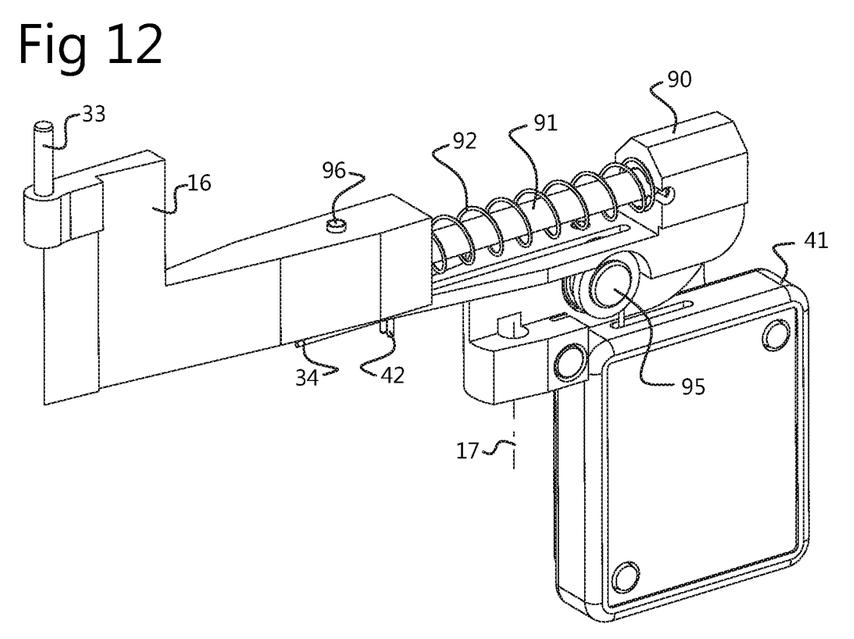
FIGS. 12-14 show details of part of the X-ray diffractometer according to an embodiment.
Figure 13:
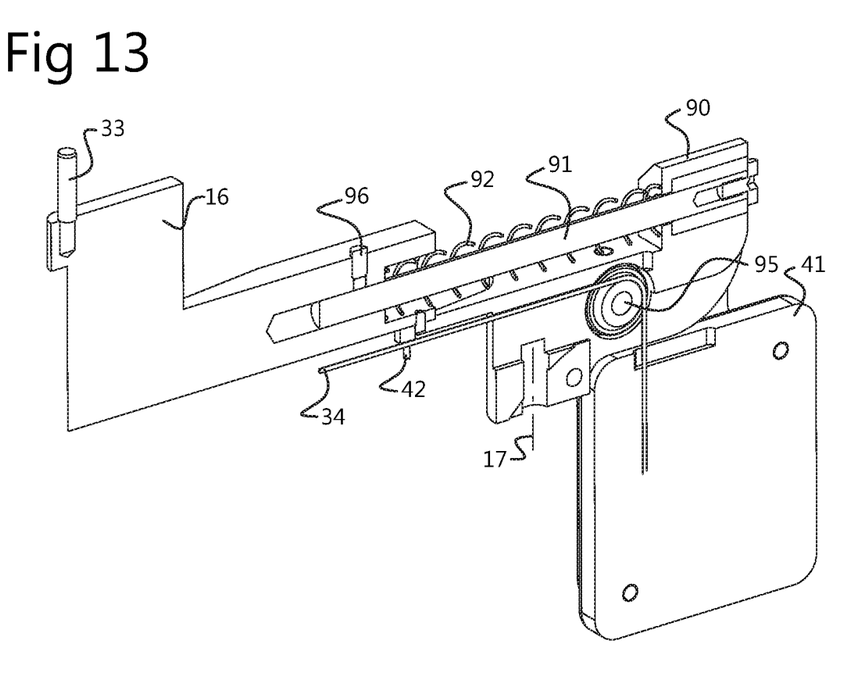
Figure 14:
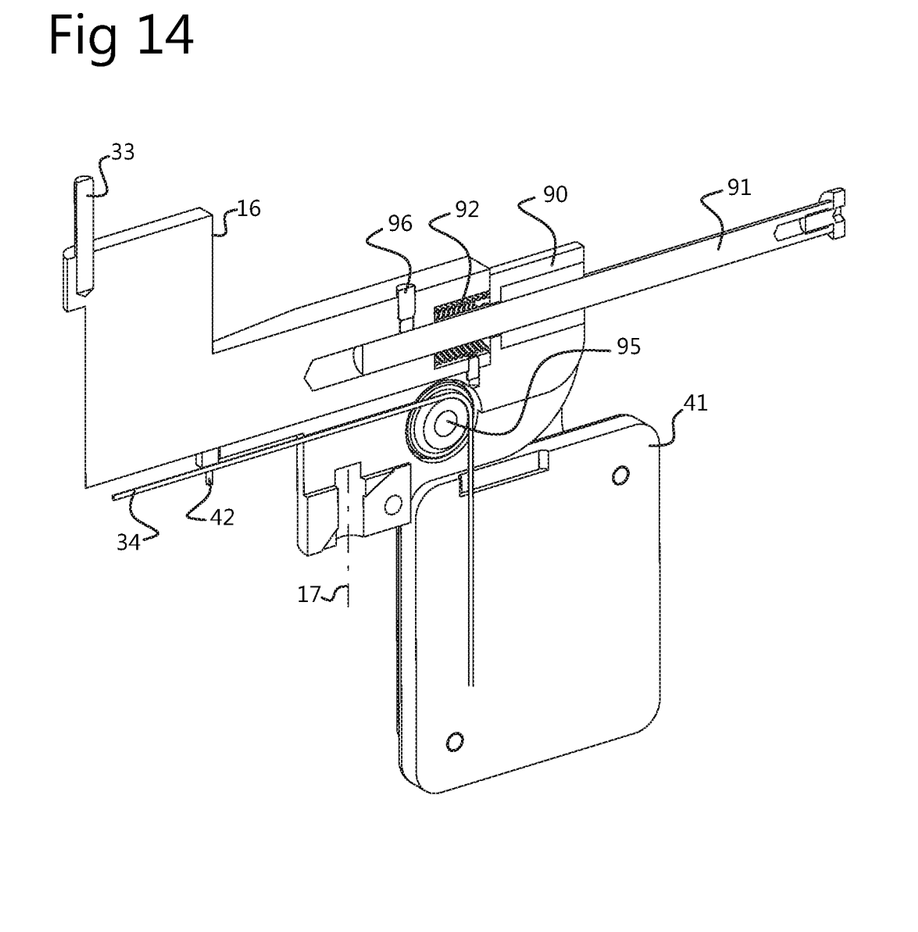

FIGS. 12-14 show details of part of the X-ray diffractometer according to an embodiment. The FIGS. show the first shield 16, which is biased by a spring 92 arranged between the shield 16 and a surface of the guiding block 90. The guiding block is rotatable around the rotation point 17. The cable 34 is biased by the spring loaded roll 41 arranged in an associated housing. Coming out of the spring loaded roll 41, the cable 34 runs along a pulley 95 and then along the bottom side of the shield 16. Once the shield 16 (in fact the pin 33 at the top of the field) is blocked by the bar 36, the cable 34 is bent at the guidance point 42 which may be embodied by two pins extending from the bottom of the guiding block 90 or of the shield 16 depending on the embodiment.

FIG. 13 shows a sliced view of the FIG. 12, so as to better show the arrangement of the spring 92. As can be seen from FIG. 13, the bar 91 is mounted into a recess of the shield 16 and fixed byway of a bolt 96. FIG. 14 shows the embodiment of FIGS. 12-13 but in the situation wherein the shield 16 is pressed towards the guiding block 90, see also FIG. 10.

It should be noted that the above-mentioned embodiments illustrate rather than limit those embodiments, and that those of ordinary skill in the art will be able to design many alternative embodiments. In the claims, any reference signs placed between parentheses shall not be construed as limiting the claim. Use of the verb "include" and its conjugations does not exclude the presence of elements or steps other than those stated in a claim. The article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An X-ray diffractometer comprising:
   a first arm and a second arm, the first arm being rotatably connected to the second arm at a first rotation point;
   a sample holder for holding a sample under investigation, the sample holder being mounted onto the first arm at an outer end of the first arm away from the first rotation point;
   an X-ray source configured to emit a divergent X-ray beam so as to irradiate a surface of the sample, wherein the second arm is rotatably connected to the X-ray source at a second rotation point;
   a detector configured to detect scattered beams coming from the sample, the detector being rotatably arranged around the first rotation point;
   a guiding device configured to guide the sample along a main axis of the X-ray beam thereby varying an angle between the first and second arm, the connection between the first and second arm forces the sample holder to rotate relative to the main axis of the X-ray beam so that an angle between the main axis of the X-ray beam and the surface of the sample is varied; and
   a shield rotatably arranged around a third rotation point which rotation point is fixed relative to the detector, the shield is being configured and arranged to shield the detector from the divergent X-ray beam coming from the X-ray source but not obstructing the scattered beams coming from the sample so as to allow the scattered beams to reach the detector.

2. The X-ray diffractometer according to claim 1, wherein the detector is coupled to the first rotation point by way of a detector arm, wherein the third rotation point is located on the detector arm next to the detector.

3. The X-ray diffractometer according to claim 2, wherein the shield includes an outer end away from the third rotation point, wherein the diffractometer further includes an orientation mechanism arranged to orientate the outer end of the shield so that while varying the angle between the main axis of the X-ray beam and the surface of the sample, the outer end points to a side edge of the sample which is nearest to the X-ray source.

4. The X-ray diffractometer according to claim 2, wherein the diffractometer includes a blocking device which forces the shield to rotate around the third rotation point in a situation wherein the shield abuts against the blocking device so as to avoid the shield from shielding the sample under investigation.

5. The X-ray diffractometer according to claim 1, wherein the shield includes an outer end away from the third rotation point, wherein the diffractometer further includes an orientation mechanism arranged to orientate the outer end of the shield so that while varying the angle between the main axis of the X-ray beam and the surface of the sample, the outer end points to a side edge of the sample which is nearest to the X-ray source.

6. The X-ray diffractometer according to claim 5, wherein the outer end of the shield is tapered.

7. The X-ray diffractometer according to claim 6, wherein the orientation mechanism includes a guiding block and a rod slidably arranged in the guiding block wherein the guiding block is rotatably arranged around the third rotation point and wherein the rod extends from the guiding block in the direction of the end of shield nearest to the sample.

8. The X-ray diffractometer according to claim 6, wherein the orientation mechanism includes a cable coupled between the detector arm near or at the third rotation point and a connection point on the first arm at the outer end of the first arm away from the first rotation point.

9. The X-ray diffractometer according to claim 5, wherein the orientation mechanism includes a guiding block and a rod slidably arranged in the guiding block wherein the guiding block is rotatably arranged around the third rotation point and wherein the rod extends from the guiding block in the direction of the end of shield nearest to the sample.

10. The X-ray diffractometer according to claim 9, wherein the shield is arranged at an outer end of the rod and wherein the shield is spring biased by a spring arranged between the shield and the guiding block.

11. The X-ray diffractometer according to claim 10, wherein the orientation mechanism includes a cable coupled between the detector arm near or at the third rotation point and a connection point on the first arm at the outer end of the first arm away from the first rotation point.

12. The X-ray diffractometer according to claim 9, wherein the orientation mechanism includes a cable coupled between the detector arm near or at the third rotation point and a connection point on the first arm at the outer end of the first arm away from the first rotation point.

13. The X-ray diffractometer according to claim 5, wherein the orientation mechanism includes a cable coupled between the detector arm near or at the third rotation point and a connection point on the first arm at the outer end of the first arm away from the first rotation point.

14. The X-ray diffractometer according to claim 13, wherein the diffractometer includes a spring loaded roll which pulls at an outer end of the cable.

15. The X-ray diffractometer according to claim 5, wherein the diffractometer includes a blocking device which forces the shield to rotate around the third rotation point in a situation wherein the shield abuts against the blocking device so as to avoid the shield from shielding the sample under investigation.

16. The X-ray diffractometer according to claim 1, wherein the diffractometer includes a blocking device which forces the shield to rotate around the third rotation point in a situation wherein the shield abuts against the blocking device so as to avoid the shield from shielding the sample under investigation.

17. The X-ray diffractometer according to claim 16, wherein the shield includes an extension extending in a direction perpendicular to a plane in which the first and second arm are able to rotate, the blocking device including a bar extending from the X-ray source towards the sample holder and being slightly angled relative to the main axis of the X-ray beam, wherein if the extension of the shield is forced against a side of the bar, the shield will rotate out of the X-ray beam.

18. The X-ray diffractometer according to claim 17, wherein the cable runs along a guidance point arranged on a bottom side of the shield or of the guiding block, wherein the cable bends at the guiding point due to forces originating from the shield being forced against the blocking device.

19. The X-ray diffractometer according to claim 1, wherein the diffractometer includes a further shield arranged close to diaphragm, the further shield extending substantially parallel to the guidance bar, wherein the further shield prevents radiation scattered from the edge of diaphragm to enter the detector.

20. The X-ray diffractometer according to claim 19, wherein the further shield can be rotated away from its original position.

* * * * *

UNITED STATES PATENT AND TRADEMARK OFFICE
CERTIFICATE OF CORRECTION

PATENT NO.         : 10,539,519 B2
APPLICATION NO.    : 15/740706
DATED              : January 21, 2020
INVENTOR(S)        : Albertus Jacobus Kinneging et al.

Page 1 of 1

It is certified that error appears in the above-identified patent and that said Letters Patent is hereby corrected as shown below:

In Column 9, Line 48, Claim 1, replace "is being" with --being--

Signed and Sealed this
Ninth Day of June, 2020

Andrei Iancu
*Director of the United States Patent and Trademark Office*